2,799,662

PROCESS FOR PRODUCING AQUEOUS DISPERSIONS OF ELASTOMERS

John L. Ernst and Joseph L. Betts, Jr., Baton Rouge, La., assignors to Esso Research and Engineering Company, a corporation of Delaware No Drawing. Application March 18, 1953, Serial No. 343,254

5 Claims. (Cl. 260—29.7)

This invention is concerned with a novel process for preparing latices of synthetic elastomers and, more particularly, with a process wherein a stable emulsion of elastomer is prepared from dry polymers using a critical combination of dispersing and finishing conditions.

It has been known to prepare aqueous dispersions of polymers and copolymers. Frequently, these emulsions are prepared directly as a result of polymerization of the monomers. It is also known that such dispersions can generally be made by dispersing organic solvent solutions of the substances in water and then removing the organic solvent.

However, certain types of synthetic elastomers have been found to give a great deal of difficulty when attempts are made to produce dispersed latices from the dried polymers. These difficulties are encountered to a more or less degree with many types of solid elastomeric materials but they are particularly troublesome with polymers having an iso-olefin such as isobutylene polymerized therein. Therefore, the isobutylene containing polymers which are especially suitable for the process of this invention include polyisobutylene, itself, and copolymers containing isobutylene copolymerized with a multiolefin, preferably a conjugated diolefin having 4 to 8, inclusive, carbon atoms. The useful conjugated diolefins for copolymerization with isobutylene include those having 4 to 8, inclusive, carbon atoms, such as 1,3-butadiene, isoprene, dimethylbutadiene and the like. Such copolymers are prepared by a low temperature polymerization in the presence of a dissolved Friedel-Crafts catalyst. These copolymers, and the process for making them, are described in U. S. Patent 2,356,128. These isoolefin-containing polymers cause considerable difficulty since they give extensive coagulation when attempts are made to prepare latices from them.

Other polymeric materials for which this process can also be used include natural rubber, polyvinyl compounds, such as acrylic and methacrylic acid esters and polyvinyl ethers, copolymers of isobutylene and styrene and the resinous, rubbery, and oily copolymers of butadiene and styrene, butadiene and acrylonitrile, polymers of diolefins such as polybutadiene, drying oils and the like.

The process of this invention avoids the difficulties generally caused when an attempt is made to convert these polymers into the latex form. With the process of this invention, a minimum of coagulation occurs, with little or no consequent loss of polymer material. The method is relatively simple and entirely reproducible as to results. The viscosity values as well as the time, temperature and processing stability of the latices are also outstanding.

The method consists of a number of integrated steps which include the dissolving of the dry polymeric material in a suitable selected solvent, dispersing the thus prepared polymer solution into a carefully selected and adjusted water-emulsifier system, and, finally, stripping out the solvent to leave the polymer dispersion. The exact details of each step must necessarily be carefully carried out. These steps are described in greater detail below.

The polymeric material, preferably one having isobutylene polymerized therein, is dissolved in any suitable manner in a solvent. As to the solvent to be selected, its choice will depend somewhat on the exact polymeric material which is to be dispersed and on the boiling point of the solvent itself. It is necessary that a solvent be used which has sufficient solvent powers for the polymeric materials. For the less polar polymers containing polymerized hydrocarbons, the aliphatic hydrocarbon solvents having from four up to about ten carbon atoms are useful. These include n-butane, isopentane, n-pentane, the hexanes, the heptanes, octane, and the like. The boiling point of the solvent must not be too high, otherwise, stripping the solvent completely from the finished dispersion will be difficult. For nitrile rubber oxygenated solvents such as those of the ketone type are satisfactory.

The normal limit as to the amount of polymeric material dissolved in the solvent will be the extent of the solubility of the polymer in the solvent. In the case of the isobutylene containing polymers such as polyisobutylenes and the isobutylene-diolefin copolymers, not more than about 10 weight percent solution should be used and preferably about 5 weight percent up to about 10 weight percent.

In the preparation of the aqueous emulsifier system, it is highly desirable to have present two emulsifiers, one of the type which is hydrocarbon soluble and one of the water soluble type.

Of the type which is hydrocarbon soluble, the alkali metal petroleum sulfonates having 20 to 21 carbon atoms arranged in an alkyl-aryl structure have been found especially useful. A particularly useful product of this type can be prepared by subjecting crude 75 sec./210° F. viscosity coastal lube oil to a phenol extraction treat followed by a sulfuric acid treat, whereupon the acid sludge from the acid treat is air blown to remove sulfur dioxide, neutralized with sodium hydroxide or the like and water washed at a convenient temperature such as 200° F. The water washed layer is then separated and desirable sodium sulfonates are concentrated in this water phase by a simple liquid-liquid extraction process.

Concentration is preferably effected with 5 to 15 volume percent ethylene glycol or diethylene glycol or combinations thereof. It has also been found that an aliphatic alcohol such as isopropanol can be used. Optimum conditions are to mix about 10 volumes of glycol or alcohol with 90 volumes of the above described water phase. The mixture is agitated, e. g. by air blowing for 2 to 3 hours at 180° F., and allowed to settle for 48 or more hours. The bottom or product water layer is drawn off and can be used directly as the emulsifier in the present invention, while a small quantity of interfacial layer containing sulfonates as well as oils may be discarded and the top layer of clear oil may be used as fuel or the like.

The sulfonate-containing water phase mentioned above has the following typical composition:

Free NaOH, percent_____ 1 max., usually 0.01 to 0.10.
Water, percent_____ 20–40, usually 15 to 30.
Sodium sulfonates, percent__ 25–35, usually 25 to 33.
Sodium sulfates, percent___ 2 max., usually 0.2 to 1.0.
Inert oils, percent_____ Remainder, usually 40 to 55.

Typical compositions of the resulting aqueous concentrations accordingly consist essentially of the following:

|  | Range (weight percent) |
|---|---|
| Water | 25–40, usually 28 to 38 |
| Glycol or alcohol | 15–25, usually 18 to 20 |
| Sodium sulfonates | 35–60, usually 40 to 50 |
| Sodium sulfates | 0–5, usually 0 to 2 |
| Inert oil | 0–10, usually 3 to 5 |

Example: Weight percent
- Water _____ 36
- Isopropanol _____ 20
- Sodium sulfonates _____ 40
- Salts _____ Trace
- Oils _____ 4

The composition can be altered by extracting with less glycol or alcohol whereby a greater quantity of oils will be obtained in the finished product. This, however, has been found to have no adverse effect on the eventual use of the product as an emulsifier, since the oil apparently acts only as an inert emulsifier diluent.

In addition to the composition given above, the emulsifier solutions thus produced have the following general characteristics:

Viscosity (Stormer, T paddle, 150
  gram load)_____ 27 to 30.
Specific gravity_____ About 1.1.
Molecular weight of sulfonate____ About 385 as acid of unknown aromatic/aliphatic ratio, but of narrow range.

As to the water soluble type, the alkali metal sulfate derivatives of certain higher alcohols have been found to be very good. These include the Tergitol class of materials such as the sodium sulfate derivative of 2-ethyl-hexanol-1, the sodium sulfate derivative 7-ethyl-2-methyl-undecanol-4, and the sodium sulfate derivative of 3,9-diethyl-tridecanol-6. These materials are usually available as aqueous solutions.

The total concentration of emulsifying agents in the aqueous phase should be in the range of 10 to 50 weight percent based on the amount of polymer. Although greater concentrations than 50% can be used, in general, the greater amount would merely be an excess and would serve no useful purpose. Of the two types of emulsifiers used equal amounts of each are satisfactory, but this can be varied widely. For emulsifying the isobutylene-diolefin copolymers, a 25 to 50 weight percent solution is preferred and about 35-40 weight percent is optimum.

The polymer-solvent mixture and the aqueous emulsifier mixture must be prechilled to a temperature below the boiling point of the solvent, prior to preparation of the dispersion. Otherwise, if there is solvent flashing before complete emulsification has occurred, there will generally be undesirable coagulation. Thus the appropriate temperature for the two mixtures at the time of emulsification will be determined by the solvent-polymer system which is being used.

The ratio of the two solutions which are emulsified can be varied considerably depending on the polymer-emulsifier systems being employed. A 1/1 ratio of the two mixtures is conveniently used.

The emulsification of these two mixtures is best accomplished under conditions using a high shear device for agitation. Sufficient mixing time should be allowed to permit complete emulsification of the two liquid phases, the temperature being maintained to prevent flashing of the solvent.

After formation of the emulsion is complete, the polymer solvent is removed by stripping or flashing, preferably under vacuum. If preferred, this entire process can be carried out at atmospheric pressure, no pressure being necessary for the operation.

After stripping of the solvent the dispersion of polymer in water is then drawn off and allowed to cream. A creaming or protective or stabilizing agent such as ammonium alginate, gum arabic, carob bean flour, casein, tragacanth, Karaya gum, starch and the like is preferably added to the stripped latex. A preservative such as sodium pentachlorophenate to keep down bacterial growth during standing and storage may also be added.

The mixture is then permitted to stand for a period of time to allow it to cream. There are obtained two layers, an upper, "cream" layer of low emulsifier, high polymer content and a lower, serum layer, containing substantially all of the emulsifying agents and free of polymer.

The aqueous dispersions so obtained may be diluted to any extent, fillers and pigments may be added and they may be mixed with dispersions of other substances.

The dispersions may be used in the same ways as the known dispersions of polymerized substances, as for example, for the preparation of coating compositions for paper and the like, for impregnation, as painting pastes for textiles, for the preparation of immersion bodies, as adhesives and binding agents, for use in all kinds of tire cord dipping, for emulsion paint preparation, for making wire insulation, for open ditch coatings, for spray preparations, and as inner sealer materials for tubeless tires.

The following examples will further illustrate in greater detail how this invention may be carried out but it is not intended that the invention be restricted in any way thereto.

EXAMPLE 1

A series of experiments, runs No. 1 through 5, inclusive, was carried out to establish an emulsifier system which could be suitably used to give the emulsion. The series of tests was carried out with GR–I–18, a polymer of 70–80, 8-minute Mooney value, having a composition of about 1.6 mol percent isoprene and 98.4 mol percent isobutylene. The various emulsifier solutions were prepared by dissolving the indicated amount of emulsifier in 100 parts by volume of water. About 5 weight percent of the above described polymer was dissolved into 50 parts by volume of n-heptane. The hydrocarbon solution of copolymer was then emulsified into the water-emulsifier mixture at a temperature of 78° F. and atmospheric pressure with suitable agitation. This represents a volume per volume ratio of water to hydrocarbon of 2/1.

At the end of 65 hours of settling time, the results indicated that a combination of a hydrocarbon and water soluble emulsifier gave the most stable emulsion. The data of these experiments are shown in Table I. In this case, the most useful combination was the Humble Industrial Cleaner-172 plus Breck hand cleaner. The composition of these two materials in shown in the footnotes of Table I.

*Table I*

TEST OF EMULSIFIERS FOR PREPARATION OF LATICES FROM DRY POLYMER

| Run No. | 1 | 2 | 3 | 4 | 5 |
|---|---|---|---|---|---|
| Emulsifier [1] | x-100 | AR | 172 | Breck | 172—Breck. |
| Wt. Percent on Polymer | 10 | 10 | 10 | 10 | 5—5. |
| Ratio Water/Hydrocarbon | 2/1 | 2/1 | 2/1 | 2/1 | 2/1. |
| Emulsification by Hamilton Beach 10,000 R. P. M. Mixer: | | | | | |
| Temperature, ° F. | 78 | 78 | 78 | 78 | 78. |
| Pressure | Atmospheric | Atmospheric | Atmospheric | Atmospheric | Atmospheric. |
| Settling Time, Hrs.[2] | 65 | 65 | 65 | 65 | 65. |
| Emulsion after Settling | distinct phase separation. | distinct phase separation. | distinct phase separation. | distinct phase separation. | good emulsion. |

[1] Emulsifiers: x-100—Triton x-100 (polyoxyethylated octyl phenol containing 8 to 10 ethylene oxide units); AR—Aquasol AR (75% sulfonated castor oil); 172—Humble Industrial Cleaner 172-2: 40% $C_{20}$ to $C_{21}$ alkylaryl sodium sulfonated oils, 4% inert oils, 20% isopropyl alcohol, 36% water; Breck—Breck hand cleaner: 46% active ingredients consisting of Tergitol Penetrant #4 (7-ethyl-2-methyl-undecanol-4), sodium hexametaphosphate, and sulfated vegetable oils selected from the group consisting of olive, tea seed, peanut or rice bran, alone or in combination.

[2] Emulsion allowed to stand to observe tendency for emulsion to break.

EXAMPLE 2

A further set of experimental runs 6 to 14, inclusive, was carried out in which additional data was obtained. These experiments were made with test modifications to the Humble Industrial Cleaner-Breck emulsifier system and using isopentane as the polymer solvent. The polymer used was GR–I–17 and GR–I–18, of 60–70 and 70–80 Mooney 8 minute values, respectively, which have a composition of about 1.6 mol percent isoprene and 98.4 mol percent isobutylene. Emulsification was carried out at 0° C. and atmospheric pressure, and stripping at 25° C. under 26 inches mercury vacuum. The results of these experiments are given in Table II. From these data, it is clear that the preparation of satisfactory latices from the dry polymer is sensitive to changes in both emulsifier content and polymer concentration in solution. Subsequently 30 runs were made under conditions of run No. 10 (Table II) and all confirm the low quantity of coagulate. The weight percent of polymer coagulated during emulsification and stripping was determined by filtering stripped latex through 150 mesh screen.

*Table II*

EFFECT OF EMULSIFIER CONCENTRATION ON COAGULATION

| Run No. | Polymer in Isopentane, Wt. Percent | Active Emulsifier on Polymer, Wt. Percent [1] | Polymer Coagulated, Wt. Percent |
|---|---|---|---|
| 6 | 5.0 | 48.8 | 0.0 |
| 7 | 5.0 | 48.8 | 0.0 |
| 8 | 5.0 | 12.3 | 57.2 |
| 9 | 5.0 | 24.6 | 17.1 |
| 10 | 5.0 | 36.9 | 1.4 |
| 11 | 10.0 | 6.1 | 85.6 |
| 12 | 10.0 | 12.3 | 38.6 |
| 13 | 10.0 | 12.3 | 30.0 |
| 14 | 10.0 | 49.0 | 19.0 |

[1] Industrial Cleaner 172–2/Breck=0.87/1.=equal quantities of active ingredients.

EXAMPLE 3

As stated in Example 2, about 30 runs were made using substantially the same conditions as those of run No. 10 above.

The 30 runs were carried out using 5% GR–I–17 in isopentane and about 37 weight percent emulsifier on polymers. The emulsifier consisted of a 50–50 mixture, on active ingredient basis, of Humble Industrial Cleaner 172–2/Breck Hand Cleaner. The ratio of water-emulsifier solution to polymer-isopentane solution was 1/1. The prechilled water-emulsifier solution was charged to a high shear blender, agitated, and the prechilled polymer in isopentane solution was added. After one minute agitation the emulsion was transferred to a second vessel and vacuum stripped free of isopentane. The stripped latex was filtered through a 150 mesh screen to determine the percent coagulation. About 2.3 weight percent based on the polymer of ammonium algenate as a 2% solution in water was added to the filtered latex with vigorous stirring. The ammonium algenate solution contained 2 weight percent sodium pentachlorophenate as a bactericide. The mixture was allowed to cream for 18 hours and the serum (lower layer) separated from the creamed latex. The final latex contained 50% solids of which no more than 3% was inert material (emulsifier and creaming agent). The latex after standing for 60 days showed no tendency to "skin" over nor was there any coagulate build up evident. The "hand" stability at this time was excellent. The serum which separated contained substantially all of the emulsifier but none of the polymer. If desired, the emulsifier content of the serum can be recovered by recycling it to subsequent latex preparation steps.

EXAMPLE 4

A series of runs numbered 15 through 18, inclusive, was studied in order to show that the exact type of emulsifier used is also very important. The results of these experimental runs are tabulated in Table III. These data show that when the Humble Industrial Cleaner is replaced with Aquasol-AR (a sulfonated castor oil) or with Triton X–45 (a polyoxyethylated octyl phenol containing 5 ethylene oxide units) it gave an inferior latex compared to the product given by the emulsifier combination of this invention.

The amount of coagulate was determined by filtering the stripped latex through 150 mesh screen. The coagulate is reported as the weight percent based on the original polymer.

*Table III*

*Alternate emulsifiers in latex*

| Run No. | 15 | 16 | 17 | 18 |
|---|---|---|---|---|
| Emulsifier [1]: | | | | |
| Identification | 172–2 | 172–2 | AR | x–45 |
| Wt. Percent on Polymer | 18.45 | 12.3 | 12.3 | 24.6 |
| Identification | Breck | Breck | Breck | Breck |
| Wt. Percent on Polymer | 18.45 | 26.5 | 26.5 | 28.3 |
| Polymer | GR–I–18 | GR–I–18 | GR–I–18 | GR–I–18 |
| Wt. Percent in Isopentane | 5 | 5 | 5 | 5 |
| Ratio W–E/P–I [2] | 1/1 | 1/1 | 1/1 | 1/1 |
| Coagulate, Wt. Percent | 1.4 | 46 | 68 | 15–20 |

[1] Emulsifiers: 172–2—Humble Industrial Cleaner-172-2; Breck—Breck Hand Cleaner; AR—Aquasol-AR; x-45—Triton x-45—"nonionic oil soluble surface active agent" of limited water solubility.
[2] W–E/P–I—volume ratio of water-emulsifier solution/polymer in isopentane solution.

What is claimed is:

1. An improved process for the preparation of a stable, coagulation resistant aqueous dispersion of a synthetic elastomeric material, having isobutylene polymerized therein which comprises preparing a solution of said elastomeric material in a volatile paraffinic hydrocarbon solvent having about 4 to 10 carbon atoms, cooling said solution below the flash temperature of said solvent, preparing an aqueous solution containing between about 10 and 50 weight percent of a mixture of emulsifying agents, said agents consisting of a hydrocarbon-soluble emulsifier which is an alkali metal salt of a $C_{20}$ to $C_{21}$ alkyl-aryl petroleum sulfonic acid having a molecular weight of about 385, prepared by subjecting a crude coastal lubricating oil having a viscosity of 75 seconds at 210° F. to phenol extraction, subjecting the phenol-treated oil to treatment with sulfuric acid to form an acid sludge, air-blowing the resulting acid sludge to remove the sulfur dioxide, neutralizing the resulting air-blown acid sludge with an alkali metal hydroxide and separating the desired alkali metal sulfonates by water washing the neutralized sludge, and a water-soluble emulsifier consisting of an alkali metal salt of a compound selected from the group consisting of sulfated 2-ethyl-hexanol-1, sulfated 7-ethyl-2-methyl-undecanol-4 and sulfated 3,9 - diethyl - tridecanol-6, a sulfated vegetable oil, said vegetable oil being selected from the group consisting of olive oil, tea seed oil, peanut oil, rice bran oil and mixtures thereof, and sodium hexametaphosphate, cooling said aqueous solution below the flash temperature of said solvent, dispersing the solvent-polymer phase in the aqueous phase, removing the solvent from the aqueous dispersion of elastomeric material and recovering a stable dispersion.

2. A process according to claim 1 in which the elastomeric material is a copolymer of isobutylene and a conjugated diolefin having 4 to 8 carbon atoms.

3. A process according to claim 1 in which the hydrocarbon soluble emulsifier and the water-soluble emulsifier are present in about equal proportions.

4. A process according to claim 1 which includes the additional step of creaming the aqueous dispersion and recovering a dispersion substantially free of emulsifying agents.

5. A process for producing stable, aqueous dispersions of synthetic isobutylene-isoprene elastomeric copolymers, which comprises dispersing in water at a temperature of about 0° C., a solution of about 5 weight percent of said copolymer dissolved in isopentane, in the presence of about 37 weight percent of equivalent proportions of at least two emulsifying agents, said agents including a hydrocarbon soluble alkali metal salt of a $C_{20}$ to $C_{21}$ alkyl-aryl petroleum sulfonic acid having a molecular weight of about 385, prepared by subjecting a crude coastal lubricating oil having a viscosity of 75 seconds at 210° F. to phenol extraction, subjecting the phenol-treated oil to treatment with sulfuric acid to form an acid sludge, air blowing the resulting acid sludge to remove the sulfur dioxide, neutralizing the resulting air-blown acid sludge with an alkali metal hydroxide and separating the desired alkali metal sulfonates by water washing the neutralized sludge, and another which is a water-soluble emulsifier consisting of a sodium salt of a compound selected from the group consisting of sulfated 2-ethyl-hexanol-1, sulfated 7-ethyl-2-methyl-undecanol-4 and sulfated 3,9-diethyl-tridecanol-6, a sulfated vegetable oil, said vegetable oil being selected from the group consisting of olive oil, tea seed oil, peanut oil, rice bran oil and mixtures thereof, and sodium hexametaphosphate, removing the isopentane by vaporization, adding a creaming agent to the dispersion, and recovering a latex substantially free of emulsifying agents.

References Cited in the file of this patent

UNITED STATES PATENTS

| | | |
|---|---|---|
| 2,296,427 | Daniel et al. | Sept. 22, 1942 |
| 2,313,144 | Gomm | Mar. 9, 1943 |